(No Model.)
A. LANGLAIS.
METHOD OF AND TOOL FOR FORMING SHEET METAL SEAMS.
No. 541,621. Patented June 25, 1895.
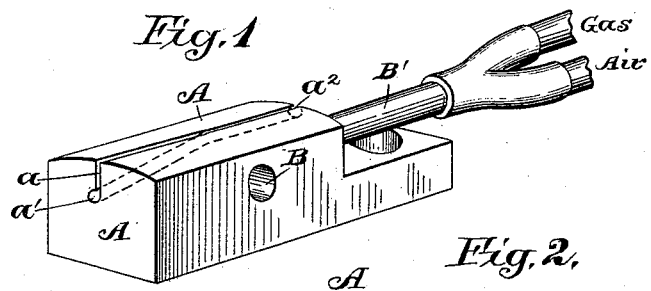
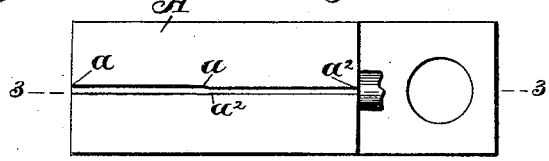
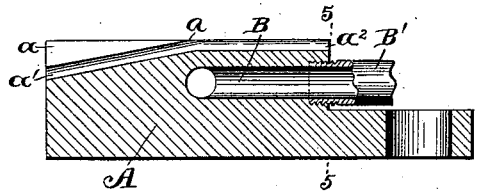
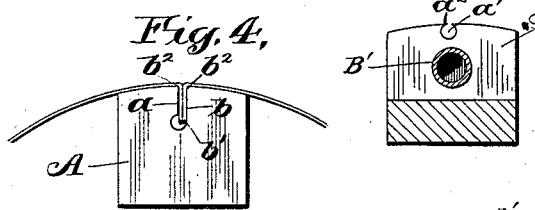 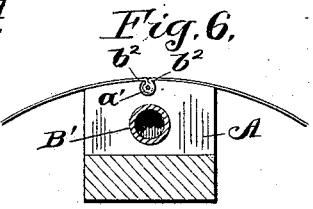
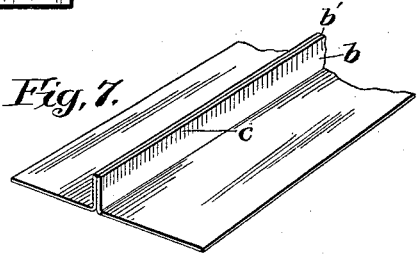
Witnesses.
S. W. Brainard.
S. W. Croy.
Inventor:
Archie Langlais
By Jacob H. Whipple
Attorney.

UNITED STATES PATENT OFFICE.

ARCHIE LANGLAIS, OF CHICAGO, ILLINOIS.

METHOD OF AND TOOL FOR FORMING SHEET-METAL SEAMS.

SPECIFICATION forming part of Letters Patent No. 541,621, dated June 25, 1895.

Application filed October 26, 1894. Serial No. 527,068. (No model.)

*To all whom it may concern:*

Be it known that I, ARCHIE LANGLAIS, of Chicago, in the State of Illinois, have invented certain new and useful Improvements in Methods or Processes of Forming Sheet-Metal Seams and in Tools Therefor, of which the following is a specification.

My improved process consists in first coating the edges of the sheets to be joined with solder, then rolling the flanged edges together under the application of sufficient heat to melt the coating of solder so that the flanges will be formed into a rolled seam and cemented together by the solder in and by the same operation. Said process may be carried into effect by means of the tool illustrated in the accompanying drawings, in which—

Figure 1 is a perspective view of said tool. Fig. 2 is a top view of the same. Fig. 3 is a vertical section on the line 3 3 of Fig. 2. Fig. 4 is an end view of said tool, showing the application of the flanged sheets therein. Fig. 5 is a section on the line 5 5 of Fig. 3, looking toward the left. Fig. 6 is a similar section showing the application of the joined sheets in the act of passing through said tool with the finished seam, and Fig. 7 is a perspective view of the flanged sheets as they are placed together before the application of the tool thereto.

In the drawings A designates a metal block composing the body of the tool.

The tool is provided with a parallel sided slot $a$ extending through part of its length and terminating in a cylindrical bore $a'$ which is inclined throughout the length and slightly beyond the parallel sided slot and is of the diameter of the seam to be formed. One of the walls of the slot is a plane in line with the periphery of said bore and the other plane in line with the axis or center of the bore, as shown in Figs. 1 and 4. The width of the slot should correspond with the thickness of the two layers $b$ of the flanged sheets. The purpose and effect of the slot are to hold the body of the flanged layers from bending and cause the bending or curling of both to commence at the extreme edges $b'$ in order that a complete revolution starting at the extreme point of the flanges may be effected during the passing of the same through the inclined portion of the bore. After passing the slot $a$ the bore is deflected to a line parallel with the face of the tool and cuts through the face of the tool so as to form a slot $a^2$ which is slightly narrower than the slot $a$. The purpose of this narrower slot is to compress the bottom of the rolled seam at $b^2$ somewhat closer together than the slot $a$ does; and the purpose of that portion of the bore which is parallel with the face of the tool is to straighten the seam and render it smooth and even and to retain the heat so as to allow the molten solder to flow perfectly between all parts of the contacting surfaces of the roll forming the seam. The tool may be heated by means of a gas jet entering a hollow B from a gas and air pipe B' which should be furnished with suitable cocks for regulating the admission of air and gas to produce the required heat. The heat however may be applied to the exterior of the tool by any ordinary means suitable for the purpose. The flanged edges of the sheet are dipped in molten solder or otherwise coated with the same as shown at $c$ so as to cover half of the flanged portion more or less and this coating may be done previously to or after the flanging and may be allowed to cool and harden upon the flange before the rolling.

Having thus described my invention, what I claim, and desire to secure by Letters Patent, is—

1. The process of forming sheet metal seams which consists in coating with solder the margins to be joined, placing them together with the edges facing toward the same direction, and then curling the margins the one with the other to form an interlocking seam under the application of sufficient heat to melt the coating in the curling operation and thereby cement the infolded contacting surfaces together as specified.

2. A sheet metal seaming tool comprising a body block provided with an inclined cylindrical bore entering at one end of the tool and converging to and cutting through the face thereof and a parallel sided slot extending from the end of the tool at which said bore enters into its cut through the face thereof, one side of said slot being a plane intercepted by the face of the tool and the periphery of said bore in line with its axis, and the other side being a plane intercepted by the face of the tool and tangential to the bore as specified.

3. A sheet metal seaming tool comprising a body block provided with an inclined cylindrical bore entering at one end of the tool and converging to and cutting through the face thereof, a deflection of said bore extended through from the said cut in the face to the opposite end of the tool and forming a slot in the face, narrower than said cut, through from it to the end of the tool, and a parallel sided slot extended along said inclined bore into its cut in the face, one side of said slot being a plane intercepted by the face of the tool and the periphery of the bore in line with its axis and the other side being a plane intercepted by the face of the tool and tangential to the periphery of the bore as specified.

ARCHIE LANGLAIS.

Witnesses:
ANNIE M. ADAMS,
WM. R. GRISWOLD.